(12) United States Patent
Wang et al.

(10) Patent No.: US 11,968,451 B2
(45) Date of Patent: Apr. 23, 2024

(54) SHOCK ABSORBING DEVICE FOR REDUCING A VIBRATION OF AN IMAGE CAPTURING DEVICE ON A MOVING VEHICLE AND IMAGE CAPTURING SYSTEM THEREWITH

(71) Applicant: Wistron Corporation, New Taipei (TW)

(72) Inventors: Jia-Syun Wang, New Taipei (TW); Chih-Fong Huang, New Taipei (TW)

(73) Assignee: Wistron Corporation, New Taipei (TW)

( * ) Notice: Subject to any disclaimer, the term of this patent is extended or adjusted under 35 U.S.C. 154(b) by 3 days.

(21) Appl. No.: 18/078,993

(22) Filed: Dec. 11, 2022

(65) Prior Publication Data

US 2024/0064403 A1 Feb. 22, 2024

(30) Foreign Application Priority Data

Aug. 18, 2022 (TW) .................................. 111131157

(51) Int. Cl.
*H04N 23/68* (2023.01)
*H04N 23/51* (2023.01)
*H04N 23/57* (2023.01)

(52) U.S. Cl.
CPC ........... *H04N 23/685* (2023.01); *H04N 23/51* (2023.01); *H04N 23/57* (2023.01); *H04N 23/6812* (2023.01)

(58) Field of Classification Search
None
See application file for complete search history.

(56) References Cited

U.S. PATENT DOCUMENTS

| | | | |
|---|---|---|---|
| 2014/0375809 A1* | 12/2014 | Song ..................... | B60R 11/04 348/148 |
| 2022/0402443 A1* | 12/2022 | Baggi .................... | H04N 23/57 |
| 2023/0347984 A1* | 11/2023 | Wang ..................... | B62D 24/04 |

FOREIGN PATENT DOCUMENTS

CN 214256422 U * 9/2021

OTHER PUBLICATIONS

CN 214256422U; "Camera For Use In Vehicle, Has Bottom Plate Whose Upper End Surface Is Provided With Two Sliding Grooves, And Two Sliding Blocks Respectively Connected In Two Sliding Grooves, Where Left And Right Sides Of Two Sliding Blocks Are Provided With Reset Spring"; Li Xian; English Translation.*

* cited by examiner

Primary Examiner — Cynthia Segura
(74) Attorney, Agent, or Firm — Winston Hsu

(57) ABSTRACT

A shock absorbing device for reducing a vibration of an image capturing device on a moving vehicle is provided and includes a case, a mounting seat movably disposed inside the case, a first supporting component, a second supporting component and a resilient assembly. The image capturing device is connected to the mounting seat. A first end of the first supporting component and a first end of the second supporting component are respectively movably connected to the case and the mounting seat. A second end of the first supporting component and a second end of the second supporting component are connected to the moving vehicle. The resilient assembly includes a first resilient component located between the mounting seat and the first supporting component, and a second resilient component located between the mounting seat and the case. Furthermore, an image capturing system having the aforementioned shock absorbing device is also provided.

20 Claims, 10 Drawing Sheets

SHOCK ABSORBING DEVICE FOR REDUCING A VIBRATION OF AN IMAGE CAPTURING DEVICE ON A MOVING VEHICLE AND IMAGE CAPTURING SYSTEM THEREWITH

BACKGROUND OF THE INVENTION

1. Field of the Invention

The present invention relates to a shock absorbing device and a system therewith, and more specifically, to a shock absorbing device for reducing a vibration of an image capturing device on a moving vehicle, and an image capturing system therewith.

2. Description of the Prior Art

Image recognition has become an important element in intelligent transportation development. If an image captured by an image capturing device is clearer, the image recognition is more successful. In order to obtain a clear image, the image capturing device is usually used together with a shock absorbing device to prevent a fuzzy or blurry image due to a vibration of a moving vehicle. However, the conventional shock absorbing device not only has complicated structure and high manufacturing cost, but also is less suitable for a high frequency vibration environment. Therefore, an improvement is urgently needed.

SUMMARY OF THE INVENTION

It is an objective of the present invention to provide shock absorbing device for reducing a vibration of an image capturing device on a moving vehicle, with simple structure and low manufacturing cost, and suitable for a high frequency vibration environment, and an image capturing system therewith for solving the aforementioned problems.

In order to achieve the aforementioned objective, the present invention discloses a shock absorbing device for reducing a vibration of an image capturing device on a moving vehicle. The shock absorbing device includes a case, a mounting seat, a first supporting component, a second supporting component and a resilient assembly. The mounting seat is movably disposed inside the case. The image capturing device is connected to the mounting seat. A first end of the first supporting component is movably connected to the case. A second end of the first supporting component is connected to the moving vehicle. A first end of the second supporting component is movably connected to the mounting seat. A second end of the second supporting component is connected to the moving vehicle. The resilient assembly includes at least one first resilient component and at least one second resilient component. The at least one first resilient component is located between the mounting seat and the first supporting component. The at least one second resilient component is located between the mounting seat and the case.

According to an embodiment of the present invention, the first end of the first supporting component is connected to the case and movable relative to the case linearly, and the first end of the second supporting component is connected to the mounting seat and rotatable relative to the mounting seat.

According to an embodiment of the present invention, an opening portion is formed on the case, and the first end of the first supporting component comprises a first connecting portion formed in a plate-shaped structure and located inside the case.

According to an embodiment of the present invention, a restraining structure is formed on the case and located adjacent to the opening portion for stopping the first connecting portion.

According to an embodiment of the present invention, a slot structure is formed on the case. The second supporting component is movably disposed through the slot structure. The first end of the second supporting component includes a second connecting portion formed in a ball-shaped structure. The mounting seat includes a connecting portion. An accommodating slot structure and a notch structure communicated with the accommodating slot structure are formed on the connecting portion. The second connecting portion is installed inside the accommodating slot structure and rotatable relative to the accommodating slot structure, and the notch structure is configured to cooperate with the second supporting component.

According to an embodiment of the present invention, the case includes a main body portion and a lateral wall portion. The lateral wall portion is detachably installed on the main body portion, and a through hole structure is formed on the lateral wall portion for allowing the image capturing device to capture light via the through hole structure.

According to an embodiment of the present invention, the lateral wall portion is made of deformable material. The lateral wall portion is concave toward an internal space enclosed by the case. A protruding structure is formed on the lateral wall portion, and the protruding structure is adjacent to the through hole structure and combined with the mounting seat.

According to an embodiment of the present invention, a first engaging structure is formed on the lateral wall portion. A second engaging structure is formed on the main body portion. The first engaging structure is configured to detachably engage with the second engaging structure, and the lateral wall portion is installed on the main body portion by an engagement of the first engaging structure and the second engaging structure.

According to an embodiment of the present invention, the shock absorbing device further includes a sensor. The mounting seat includes a mounting portion. The mounting portion includes an outer shell and an inner shell. The inner shell is fixedly disposed inside the outer shell. The image capturing device is located inside the inner shell, and the sensor being disposed on the inner shell and located between the inner shell and the outer shell for obtaining a moving information of the image capturing device.

According to an embodiment of the present invention, the mounting seat includes a mounting portion and a connecting portion fixedly connected to the mounting portion. The image capturing device is connected to the mounting portion, and the second supporting component is connected to the connecting portion.

According to an embodiment of the present invention, a longitudinal direction of the at least one first resilient component and a longitudinal direction of the at least one second resilient component are parallel to a first direction and respectively located at two opposite sides of the mounting seat.

According to an embodiment of the present invention, the resilient assembly further includes at least one third resilient component and at least one fourth resilient component, and a longitudinal direction of the at least one third resilient component and a longitudinal direction of the at least one fourth resilient component are perpendicular to the first direction and respectively located at another two opposite sides of the mounting seat.

Besides, the present invention further discloses an image capturing system for a moving vehicle. The image capturing system includes an image capturing device and a shock absorbing device for reducing a vibration of the image capturing device. The shock absorbing device includes a case, a mounting seat, a first supporting component, a second supporting component and a resilient assembly. The mounting seat is movably disposed inside the case. The image capturing device is connected to the mounting seat. A first end of the first supporting component is movably connected to the case. A second end of the first supporting component is connected to the moving vehicle. A first end of the second supporting component is movably connected to the mounting seat. A second end of the second supporting component is connected to the moving vehicle. The resilient assembly includes at least one first resilient component and at least one second resilient component. The at least one first resilient component is located between the mounting seat and the first supporting component. The at least one second resilient component is located between the mounting seat and the case.

According to an embodiment of the present invention, the first end of the first supporting component is connected to the case and movable relative to the case linearly, and the first end of the second supporting component is connected to the mounting seat and rotatable relative to the mounting seat.

According to an embodiment of the present invention, an opening portion and a restraining structure are formed on the case. The first end of the first supporting component includes a first connecting portion formed in a plate-shaped structure and located inside the case. A shape and a size of the opening portion respectively match with a shape and a size of the first connecting portion, and the restraining structure is located adjacent to the opening portion for stopping the first connecting portion.

According to an embodiment of the present invention, a slot structure is formed on the case. The second supporting component is movably disposed through the slot structure. The first end of the second supporting component includes a second connecting portion formed in a ball-shaped structure. The mounting seat includes a connecting portion. An accommodating slot structure and a notch structure communicated with the accommodating slot structure are formed on the connecting portion. The second connecting portion is installed inside the accommodating slot structure and rotatable relative to the accommodating slot structure, and the notch structure is configured to cooperate with the second supporting component.

According to an embodiment of the present invention, the case includes a main body portion and a lateral wall portion. The lateral wall portion is detachably installed on the main body portion. A through hole structure is formed on the lateral wall portion for allowing the image capturing device to capture light via the through hole structure. The lateral wall portion is made of deformable material. The lateral wall portion is concave toward an internal space enclosed by the case. A protruding structure is formed on the lateral wall portion, and the protruding structure is adjacent to the through hole structure and combined with the mounting seat.

According to an embodiment of the present invention, a first engaging structure is formed on the lateral wall portion. A second engaging structure is formed on the main body portion. The first engaging structure is configured to detachably engage with the second engaging structure, and the lateral wall portion is installed on the main body portion by an engagement of the first engaging structure and the second engaging structure.

According to an embodiment of the present invention, the shock absorbing device further includes a sensor. The mounting seat includes a mounting portion. The mounting portion includes an outer shell and an inner shell. The inner shell is fixedly disposed inside the outer shell. The image capturing device is located inside the inner shell, and the sensor is disposed on the inner shell and located between the inner shell and the outer shell for obtaining a moving information of the image capturing device.

According to an embodiment of the present invention, the resilient assembly further includes at least one third resilient component and at least one fourth resilient component. A longitudinal direction of the at least one first resilient component and a longitudinal direction of the at least one second resilient component are parallel to a first direction and respectively located at two opposite sides of the mounting seat, and a longitudinal direction of the at least one third resilient component and a longitudinal direction of the at least one fourth resilient component are perpendicular to the first direction and respectively located at another two opposite sides of the mounting seat.

In summary, in the present invention, when the moving vehicle vibrates, the present invention can effectively reduce a vibration of the image capturing device for preventing a fuzzy or blurry image by a movable connection of the first supporting component and the case, a movable connection of the second supporting component and the mounting seat, a resilient deformation of the first resilient component connected to the mounting seat and the first supporting component, and a resilient deformation of the second resilient component connected to the mounting seat and the case. The present invention not only has simple structure and low manufacturing cost but also is suitable for a high frequency vibration environment, and therefore, the present invention can solve problems in the prior art.

These and other objectives of the present invention will no doubt become obvious to those of ordinary skill in the art after reading the following detailed description of the preferred embodiment that is illustrated in the various figures and drawings.

DETAILED DESCRIPTION

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "left", "right", "front", "back", etc., is used with reference to the orientation of the FIGURE(s) being described. The components of the present invention can be positioned in a number of different orientations. As such, the directional terminology is used for purposes of illustration and is in no way limiting. Accordingly, the drawings and descriptions will be regarded as illustrative in nature and not as restrictive. Also, if not specified, the term "connect" is intended to mean either an indirect or direct mechanical connection. Thus, if a first device is connected to a second device, that connection may be through a direct mechanical connection, or through an indirect mechanical connection via other devices and connections.

Figure 1:
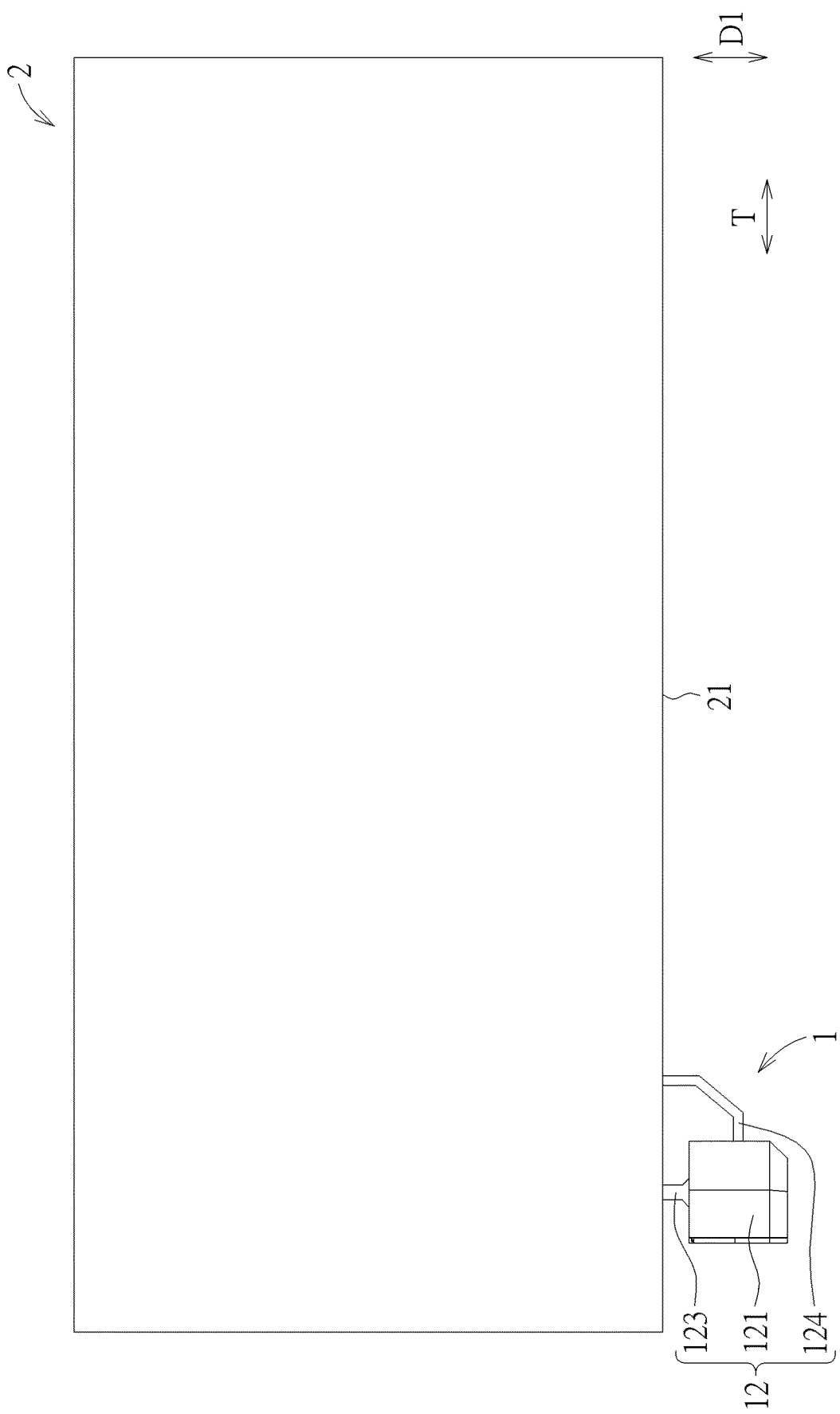
FIG. 1 to FIG. 3 are installation diagrams of an image capturing system at different views according to a first embodiment of the present invention.
Figure 2:
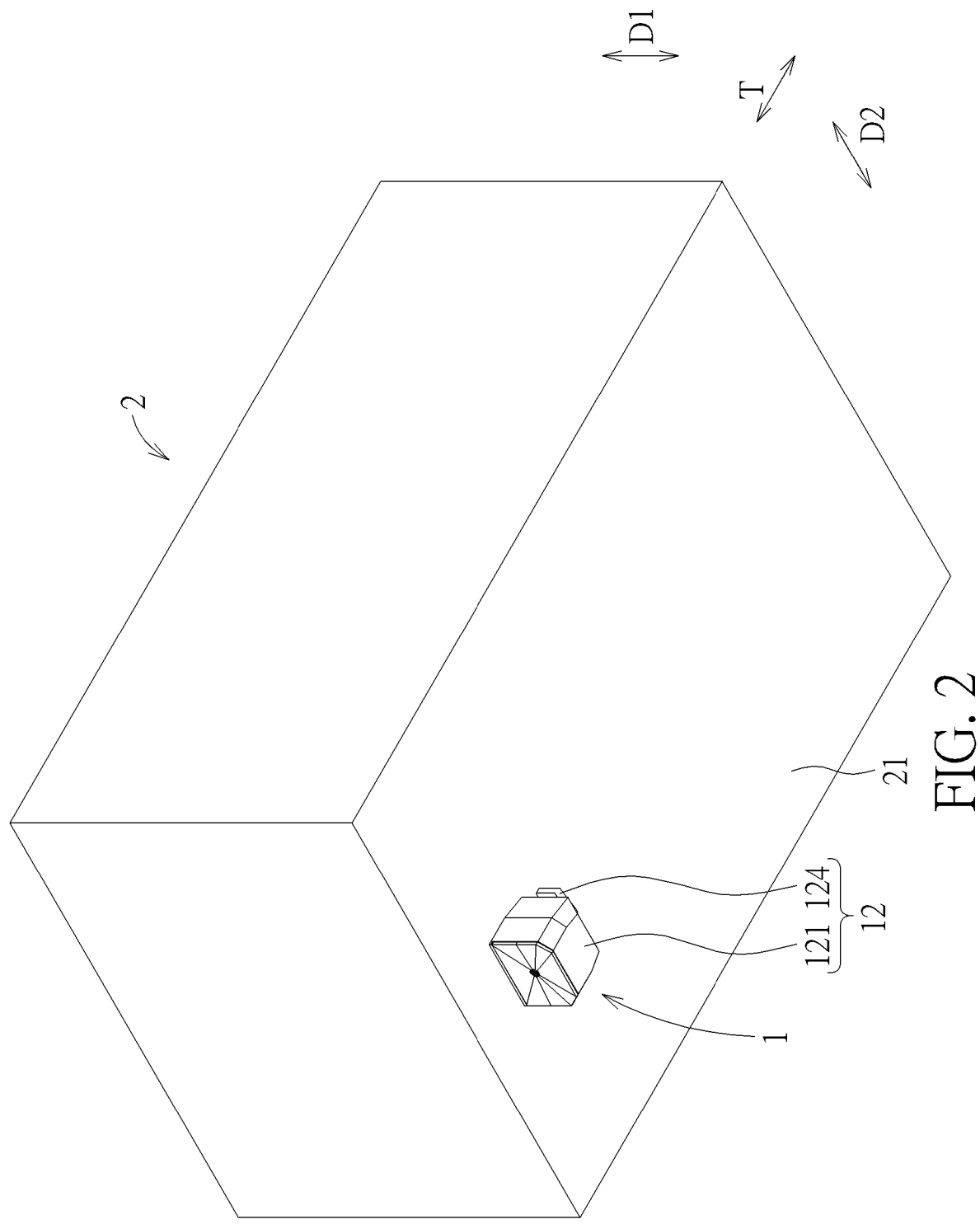
Figure 3:
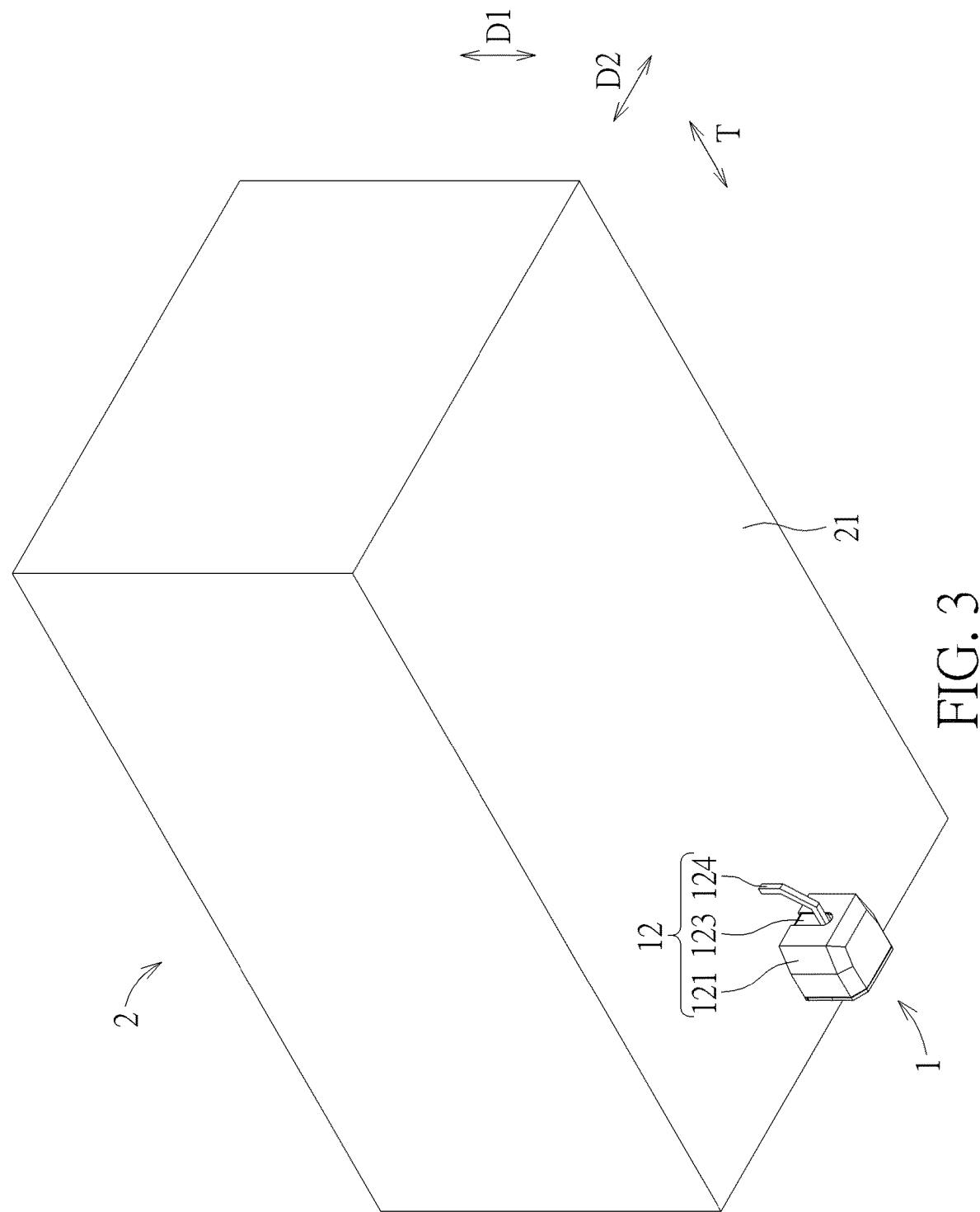

Please refer to FIG. 1 to FIG. 3. FIG. 1 to FIG. 3 are installation diagrams of an image capturing system 1 at different views according to a first embodiment of the present invention. As shown in FIG. 1 to FIG. 3, the image capturing system 1 is installed on a moving vehicle 2, such as a car. FIG. 1 to FIG. 3 illustrate a position of the image capturing system 1 relative to the moving vehicle 2. The moving vehicle 2 shown in FIG. 1 to FIG. 3 is illustrated as a block, and specific structures of the moving vehicle 2 are omitted for simplicity. In this embodiment, the image capturing system 1 can be installed on a bottom side 21 of the moving vehicle 2. However, the present invention is not limited to this embodiment. For example, in another embodiment, the image capturing system can be disposed on a topside of the moving vehicle opposite to the bottom side of the moving vehicle, or a lateral side of the moving vehicle adjacent to the bottom side of the moving vehicle.

Figure 4:
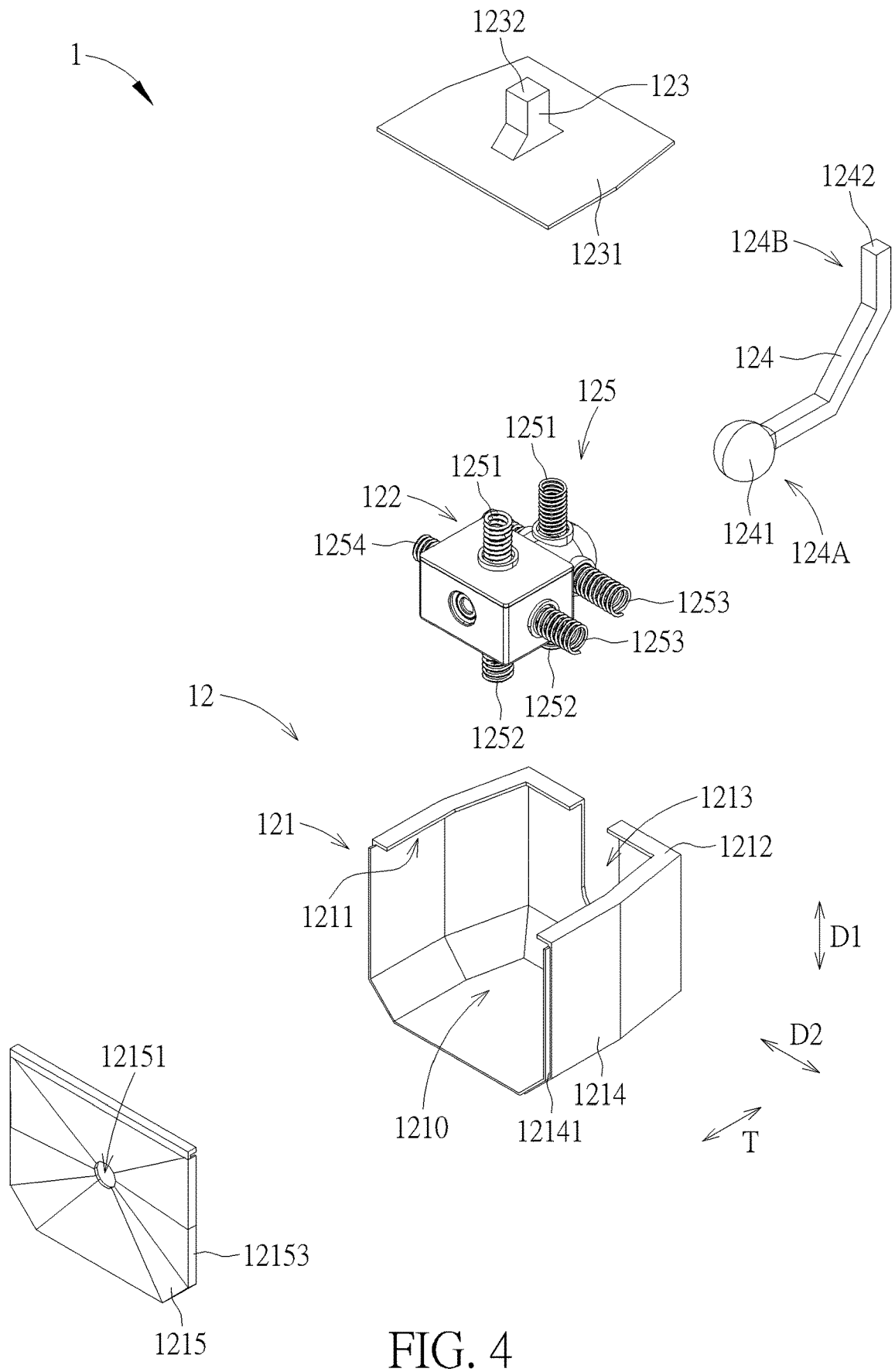
FIG. 4 to FIG. 6 are exploded diagrams of the image capturing system at different views according to the first embodiment of the present invention.
Figure 5:
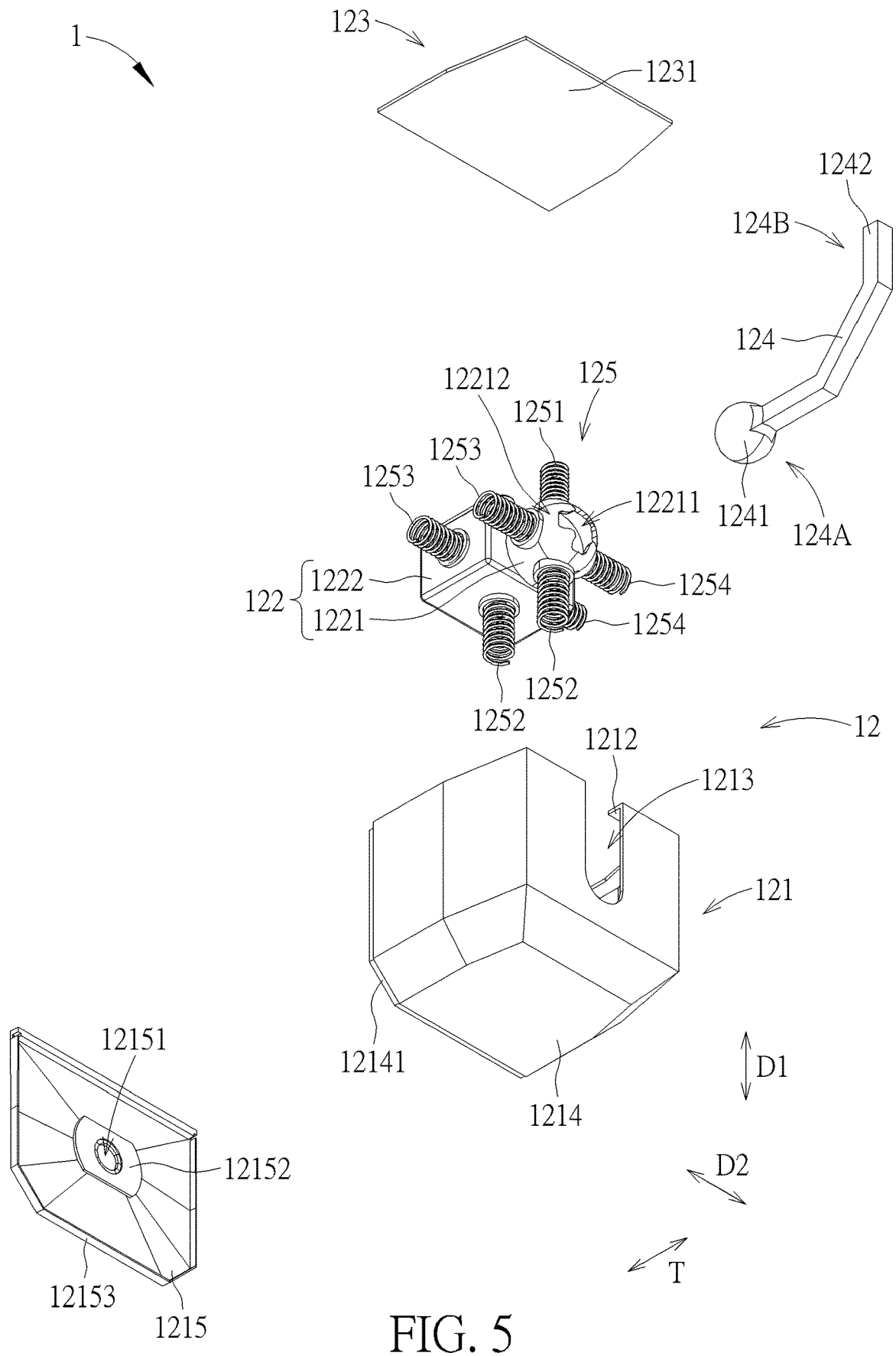
Figure 6:
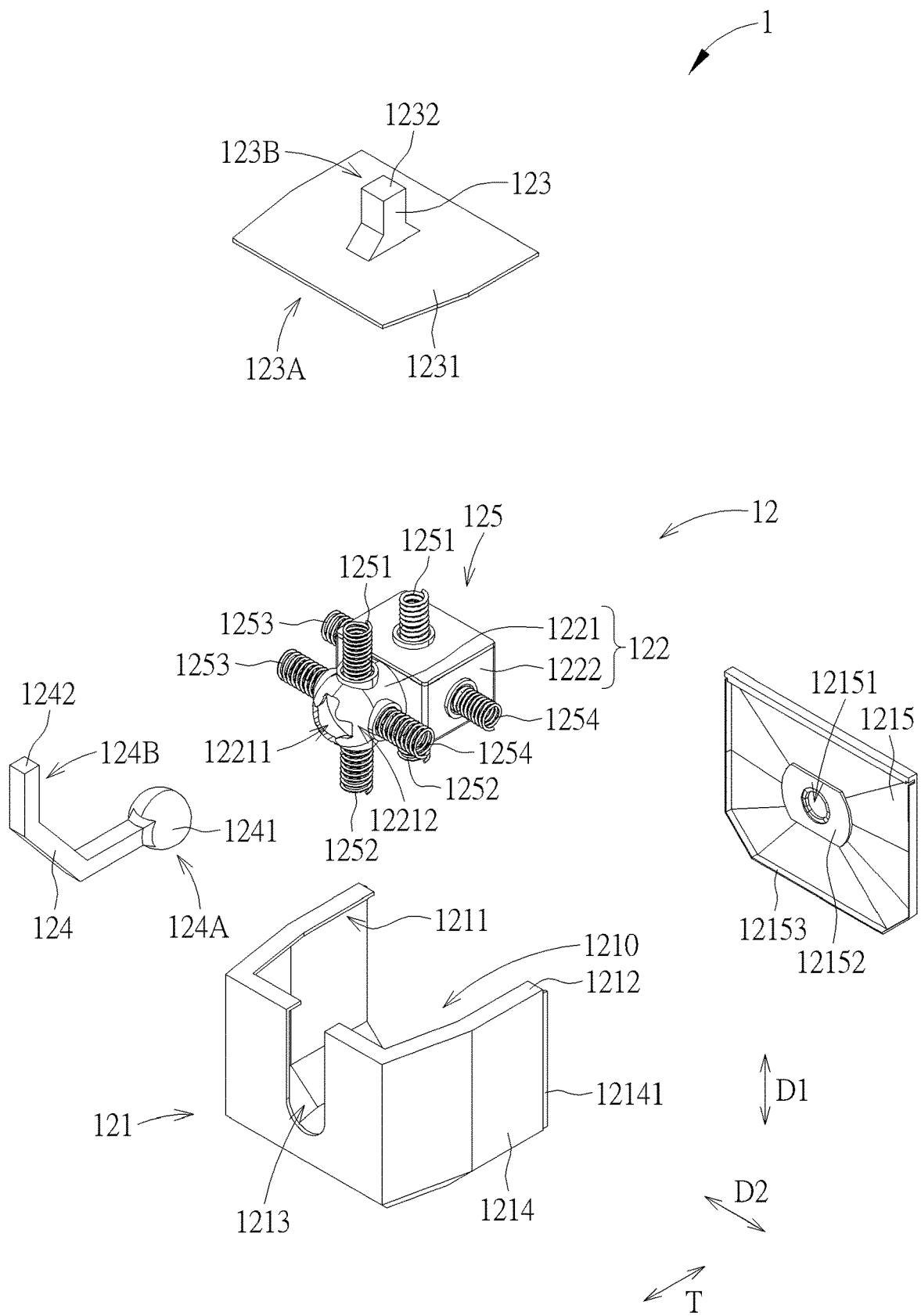
Figure 7:
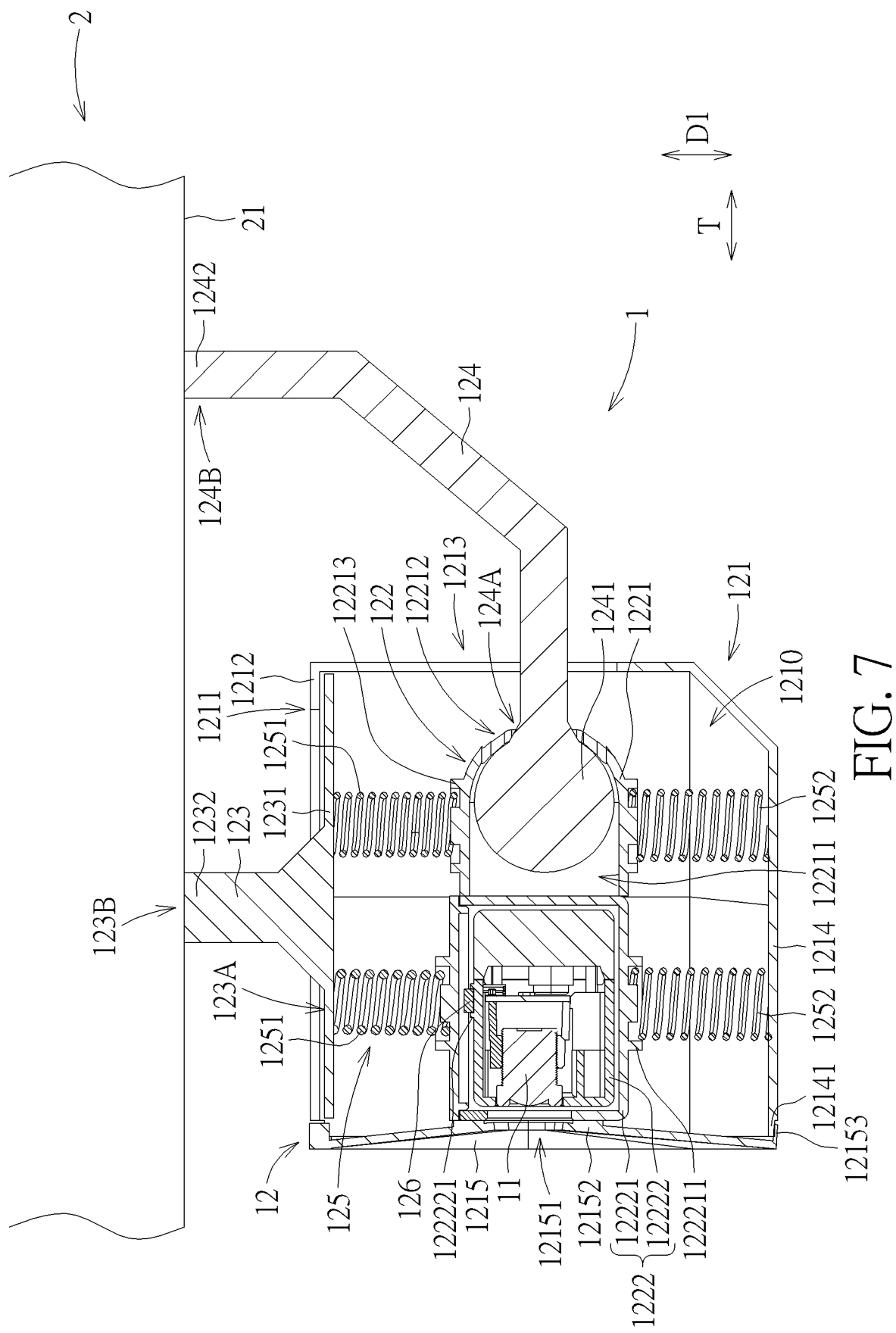
FIG. 7 is a sectional diagram of the image capturing system according to the first embodiment of the present invention.
Figure 8:
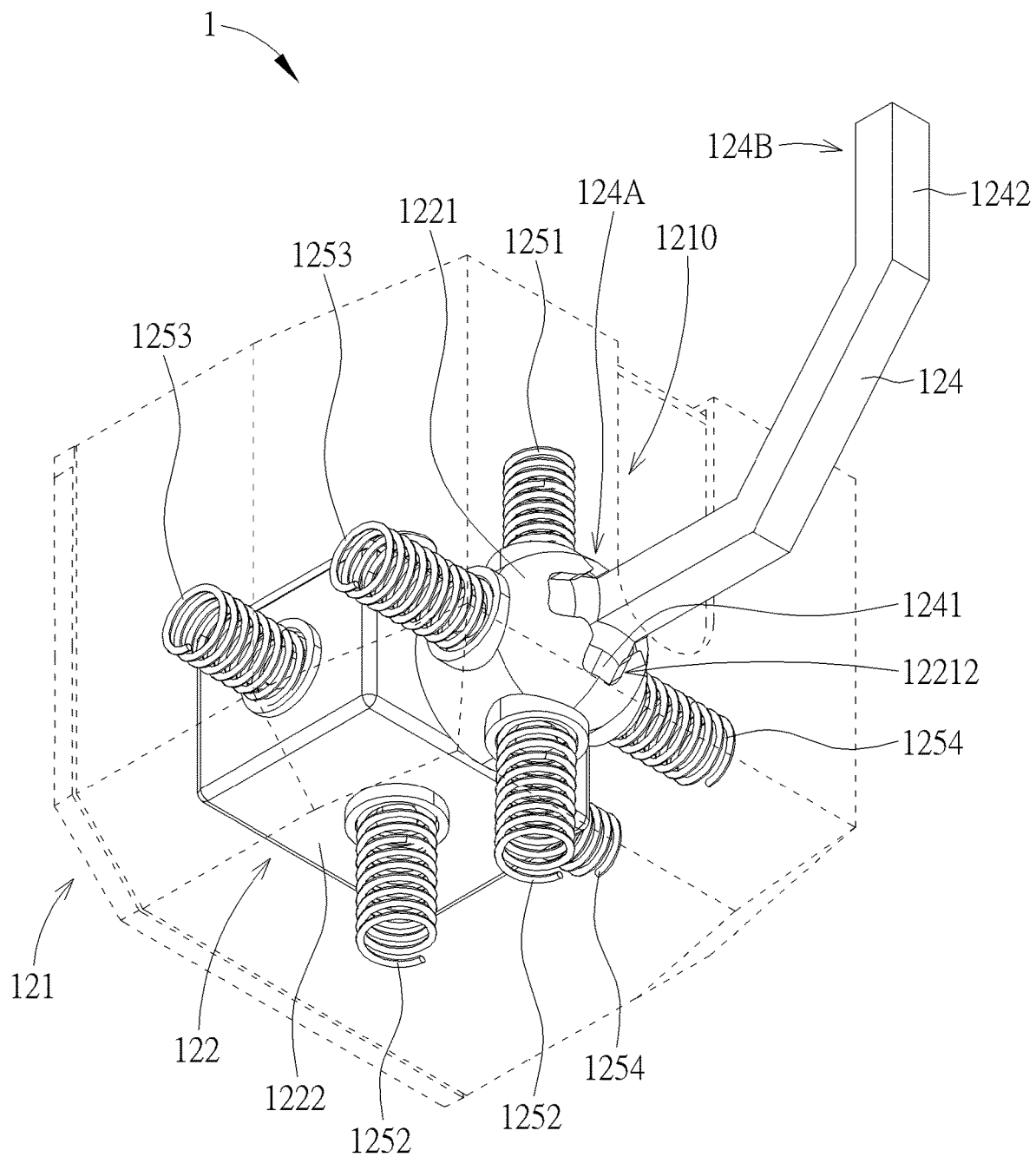
FIG. 8 is a partial internal structural diagram of the image capturing system according to the first embodiment of the present invention.

Please refer to FIG. 1 to FIG. 8. FIG. 4 to FIG. 6 are exploded diagrams of the image capturing system 1 at different views according to the first embodiment of the present invention. FIG. 7 is a sectional diagram of the image capturing system 1 according to the first embodiment of the present invention. FIG. 8 is a partial internal structural diagram of the image capturing system 1 according to the first embodiment of the present invention. As shown in FIG. 1 to FIG. 8, the image capturing system 1 includes an image capturing device 11 and a shock absorbing device 12. The image capturing device 11 can be a camera, a video recorder or a dash cam. The shock absorbing device 12 can reduce a vibration of the image capturing device 11 on the moving vehicle 2. The shock absorbing device 12 includes a case 121, a mounting seat 122, a first supporting component 123, a second supporting component 124 and a resilient assembly 125. The mounting seat 122 is movably disposed inside the case 121. The image capturing device 11 is connected to the mounting seat 122. A first end 123A of the first supporting component 123 is movably connected to the case 121. A second end 123B of the first supporting component 123 is configured to be connected to the bottom side 21 of the moving vehicle 2. A first end 124A of the second supporting component 124 is movably connected to the mounting seat 122. A second end 124B of the second supporting component 124 is configured to be connected to the bottom side 21 of the moving vehicle 2. The first supporting component 123 and the second supporting component 124 can be connected to the bottom side 21 of the moving vehicle 2 and immovable relative to the moving vehicle 2. For example, the first supporting component 123 and the second supporting component 124 can be fixedly connected to the bottom side 21 of the moving vehicle 2 by riveting or welding, or the first supporting component 123 and the second supporting component 124 can be detachably connected to the bottom side 21 of the moving vehicle 2 by a fastening component, such as a screw element. The resilient assembly 125 includes two first resilient components 1251 and two second resilient components 1252. The two first resilient components 1251 are located between the mounting seat 122 and the first supporting component 123. The two second resilient components 1252 are located between the mounting seat 122 and the case 121.

As shown in FIG. 4 to FIG. 8, the first end 123A of the first supporting component 123 is connected to the case 121 and movable relative to the case 121 linearly, i.e., along a first direction D1 back and forth. The two first resilient components 1251 are spaced from each other along a travelling direction T of the moving vehicle 2. The two second resilient components 1252 are spaced from each other along the travelling direction T of the moving vehicle 2. Each of the first resilient components 1251 and the corresponding second resilient component 1252 are aligned with each other along the first direction D1 and respectively located at two opposite sides of the mounting seat 122. Any of the first resilient components 1251 and the second resilient components 1252 can be resiliently deformed to provide a buffering effect for reducing a vibration of the image capturing device 11 along the first direction D1. The first direction D1 can be a vertical direction, i.e., a gravity direction, perpendicular to the travelling direction T of the moving vehicle 2. A longitudinal direction of each of the first resilient components 1251 and a longitudinal direction of each of the second resilient components 1252 can be parallel to the first direction D1. Specifically, in this embodiment, each of the first resilient components 1251 and each of the second resilient components 1252 can be springs, and each of the first resilient components 1251 and each of the second resilient components 1252 can resiliently extend or retract along the first direction D1. However, the present invention is not limited to this embodiment. For example, in another embodiment, the first resilient component and the second resilient component can be torsional springs, leaf springs or rubber elastomers.

It should be noticed that the numbers and the configurations of the first resilient component and the second resilient component are not limited to this embodiment. For example, in another embodiment, the resilient assembly can include one first resilient component and one second resilient component only. Alternatively, in another embodiment, each of the first resilient components and the corresponding second resilient component can be misaligned with each other along the first direction and respectively located at two opposite sides of the mounting seat. It depends on practical demands.

Furthermore, in this embodiment, in order to reduce a vibration of the image capturing device 11 along a second direction D2 perpendicular to the first direction D1, the resilient assembly 125 can further include two third resilient components 1253 and two fourth resilient components 1254. The two third resilient components 1253 are spaced from each other along the travelling direction T of the moving vehicle 2. The two fourth resilient components 1254 are spaced from each other along the travelling direction T of the moving vehicle 2. Each of the third resilient components 1253 and the corresponding fourth resilient component 1254 are aligned with each other along the second direction D2 and respectively located at another two opposite sides of the mounting seat 122. The second direction D2 can be a horizontal direction perpendicular to the travelling direction T of the moving vehicle 2. A longitudinal direction of each of the third resilient components 1253 and a longitudinal direction of each of the fourth resilient components 1254 can be parallel to the second direction D2 and perpendicular to the first direction D1. Specifically, in this embodiment, each of the third resilient components 1253 and each of the fourth resilient components 1254 can be springs, and each of the third resilient components 1253 and each of the fourth resilient components 1254 can resiliently extend or retract along the second direction D2. However, the present invention is not limited to this embodiment. For example, in another embodiment, the third resilient component and the fourth resilient component can be torsional springs, leaf springs or rubber elastomers.

It should be noticed that the numbers and the configurations of the third resilient component and the fourth resilient component are not limited to this embodiment. For example, in another embodiment, the resilient assembly can include one third resilient component and one fourth resilient component only. Alternatively, in another embodiment, each of the third resilient components and the corresponding fourth resilient component can be misaligned with each other along the second direction and respectively located at two opposite sides of the mounting seat. Alternatively, in another embodiment, the resilient assembly can include one first resilient component and one second resilient component only, and the third resilient component and the fourth resilient component can be omitted.

In addition, the materials and/or the structures of the first resilient component, the second resilient component, the third resilient component and the fourth resilient component can be identical or different. For example, in another embodiment, the first resilient component and the second resilient component can be metal springs, and the third resilient component and the fourth resilient component can be rubber columns.

As shown in FIG. 4 to FIG. 8, a chamber 1210 and an opening portion 1211 are formed on the case 121. The chamber 1210 is located inside the case 121. The opening portion 1211 has an opening communicated with the chamber 1210. The mounting seat 122 is located inside the chamber 1210. The first end 123A of the first supporting component 123 includes a first connecting portion 1231. The second end 123B of the first supporting component 123 includes a first fixing connecting portion 1232 opposite to the first connecting portion 1231. The first fixing connecting portion 1232 is connected to the bottom side 21 of the moving vehicle 2 and immovable relative to the moving vehicle 2. The first connecting portion 1231 is formed in a plate-shaped structure and located inside the chamber 1210. A shape and a size of the opening portion 1211 respectively match with a shape and a size of the first connecting portion 1231. An outer periphery of the first connecting portion 1231 can cooperate with an inner periphery of the opening portion 1211 to guide the first supporting component 123 to move relative to the case 121 along the first direction D1.

In another embodiment, in order to guide the first supporting component to move relative to the case along the first direction, the shock absorbing device can further include a guiding assembly disposed between the outer periphery of the first connecting portion and the inner periphery of the second connecting portion. For example, the guiding assembly can include a first rail and a second rail slidable along the first rail, or include a sliding slot and a sliding pin slidable along the sliding slot.

Moreover, a restraining structure 1212 is formed on the case 121 and located adjacent to the opening portion 1211 for stopping the first connecting portion 1231 to prevent the first supporting component from being disengaged from the case 121. Specifically, in this embodiment, the restraining structure 1212 can be a bending edge structure adjacent to the opening portion 1211. However, the present invention is not limited to this embodiment. For example, in another embodiment, the restraining structure can be a protruding rib or a protruding block.

As shown in FIG. 4 to FIG. 8, the first end 124A of the second supporting component 124 is connected to the mounting seat 122 and rotatable relative to the mounting seat 122.

In this embodiment, the mounting seat 122 includes a connecting portion 1221 configured to be connected to the second supporting component 124. The first end 124A of the second supporting component 124 includes a second connecting portion 1241. The second end 124B includes a second fixing connecting portion 1242 opposite to the second connecting portion 1241. The second connecting portion 1241 is formed in a ball-shaped structure. An accommodating slot structure 12211 is formed inside the connecting portion 1221. The second connecting portion 1241 is installed inside the accommodating slot structure 12211 and rotatable relative to the accommodating slot structure 12211.

In addition, a notch structure 12212 is formed on the connecting portion 1221 and communicated with the accommodating slot structure 12211. The notch structure 12212 is configured to cooperate with the second supporting component 124 to guide a rotating direction of the second connecting portion 1241 relative to the accommodating slot structure 12211 and/or to prevent any interference between the second supporting component 124 and the connecting portion 1221 when the second connecting portion 1241 rotates relative to the accommodating slot structure 12211. Specifically, in this embodiment, the notch structure 12212 can be formed in a cross-shaped structure for allowing the second connecting portion 1241 to rotate relative to the accommodating slot structure 12211 around two rotating axes perpendicular to each other. However, the present invention is not limited to this embodiment. For example, in another embodiment, the notch structure can be formed in a double cross-shaped structure, a circular-shaped structure or an ellipse-shaped structure.

Besides, a slot structure 1213 is formed on the case 121. The second supporting component 124 is movably disposed through the slot structure 1213. Specifically, in this embodiment, the slot structure 1213 can be an elongated slot structure extending along the first direction D1. However, the present invention is not limited to this embodiment. For example, in another embodiment, the slot structure can be a circular slot structure or a square slot structure.

As shown in FIG. 4 to FIG. 8, the case 121 includes a main body portion 1214 and a lateral wall portion 1215. The restraining structure 1212 is formed on the main body portion 1214. The lateral wall portion 1215 is detachably installed on the main body 1214. A through hole structure 12151 is formed on the lateral wall portion 1215 for allowing the image capturing device 11 to capture light via the through hole structure 12151.

In this embodiment, the lateral wall portion 1215 can be made of deformable material, such as rubber. The lateral wall portion 1215 is concave toward an internal space enclosed by the case 121, so that the lateral wall portion 1215 is formed in an umbrella-shaped structure or a hopper-shaped structure. A protruding structure 12152 is formed on the lateral wall portion 1215. The protruding structure 12152 is adjacent to the through hole structure 12151 and combined with the mounting seat 122. For example, the protruding structure 12152 can be adhered to the mounting seat 122. The aforementioned configuration can effectively prevent a field of view of the image capturing device 11 from being obstructed by the lateral wall portion 1215.

Furthermore, a first engaging structure 12153 is formed on the lateral wall portion 1215. A second engaging structure 12141 is formed on the main body portion 1214. The first engaging structure 12153 is configured to detachably engage with the second engaging structure 12141. The lateral wall portion 1215 is installed on the main body portion 1214 by an engagement of the first engaging structure 12153 and the second engaging structure 12141. Specifically, in this embodiment, the first engaging structure 12153 can be a resilient protruding rim adjacent to an outer periphery of the lateral wall portion 1215, and the second engaging structure 12141 can be an abutting protruding rim configured to abut against the first engaging structure 12153 for resiliently deforming the first engaging structure 12153 outwardly. However, the present invention is not limited to this embodiment. For example, in another embodiment, the first engaging structure can be a resilient hook, and the second engaging structure can be a recess portion.

As shown in FIG. 7, the shock absorbing device 12 further includes a sensor 126 disposed on the mounting seat 1222 and configured to obtain a moving information of the image capturing device 11. According to the moving information of the image capturing device 11 obtained by the sensor 126, at least one of the first resilient component 1251, the second resilient component 1252, the third resilient component 1253 and the fourth resilient component 1254 can be replaced to have a different elastic coefficient, so as to further reduce the vibration of the image capturing device 11. Specifically, in this embodiment, the sensor 126 can be a gyroscope configured to obtain angular velocity of the image capturing device 11. However, the present invention is not limited to this embodiment. For example, in another embodiment, the sensor can be an accelerometer configured to obtain acceleration of the image capturing device.

In this embodiment, the mounting seat 122 further includes a mounting portion 1222 connected to the connecting portion 1221 and for mounting the image capturing device 11. The connecting portion 1221 and the mounting portion 1222 are arranged along the travelling direction T of the moving vehicle 2. The mounting portion 1222 includes an outer shell 12221 and an inner shell 12222. One of the two first resilient components 1251, one of the two second resilient components 1252, one of the two third resilient components 1253 and one of the two fourth resilient components 1254 are connected to the outer shell 12221 and partially accommodated inside four first mounting slots 122211 formed on the outer shell 12221 respectively. The other one of the two first resilient components 1251, the other one of the two second resilient components 1252, the other one of the two third resilient components 1253 and the other one of the two fourth resilient components 1254 are connected to the connecting portion 1221 and partially accommodated inside four second mounting slots 12213 formed on the connecting portion 1221 respectively. The inner shell 12222 is fixedly disposed inside the outer shell 12221. The image capturing device 11 is connected to the mounting portion 1222, e.g., by a screw member or an adhesive glue, and located inside the inner shell 12222. The sensor 126 is disposed on the inner shell 12222 and located between the inner shell 12222 and the outer shell 12221.

However, the configurations of the resilient assembly and the mounting seat are not limited to this embodiment. For example, in another embodiment, the resilient assembly can only include one first resilient component, one second resilient component, one third resilient component and one fourth resilient component which are connected to the outer shell. Alternatively, in another embodiment, the resilient assembly can only include one first resilient component and one second resilient component which are connected to the outer shell.

Besides, a positioning structure 122221 is formed on the inner shell 12222 and configured to position the sensor 126. Specifically, in this embodiment, the positioning structure 122221 can be defined by a restraining rib protruding from the inner shell 12222. However, the present invention is not limited to this embodiment. For example, in another embodiment, the positioning structure can be a restraining recess formed on the inner shell.

In this embodiment, when the moving vehicle 2 vibrates, the shock absorbing device 12 can effectively reduce the vibration of the image capturing device 11 for preventing a fuzzy or blurry image by a movable connection of the first supporting component 123 and the case 121, a movable connection of the second supporting component 124 and the mounting seat 122, a resilient deformation of any of the first resilient components 1251, a resilient deformation of any of the second resilient components 1252, a resilient deformation of any of the third resilient components 1253 and a resilient deformation of any of the fourth resilient components 1254.

Figure 9:
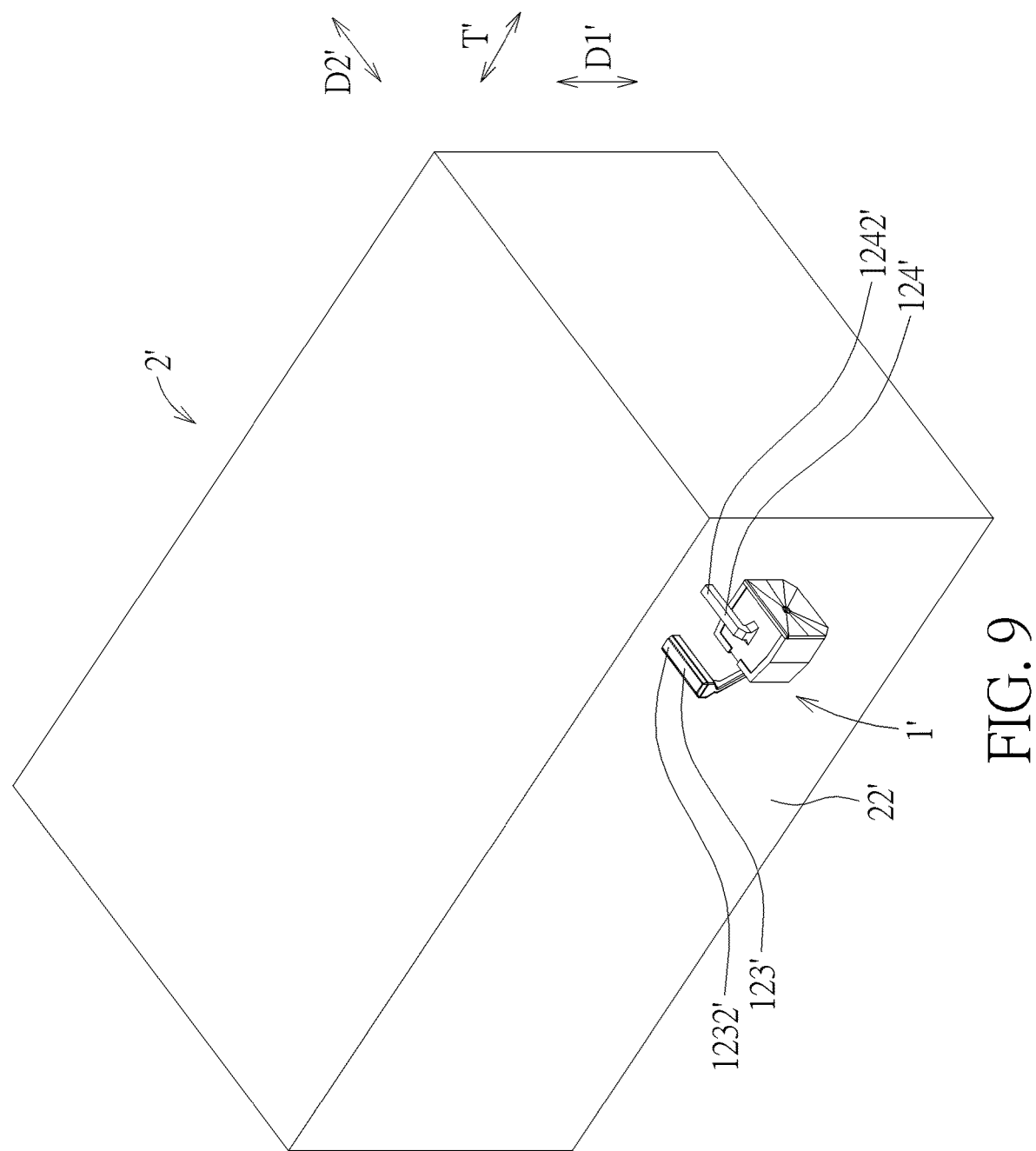
FIG. 9 and FIG. 10 are installation diagrams of an image capturing system at different views according to a second embodiment of the present invention.
Figure 10:
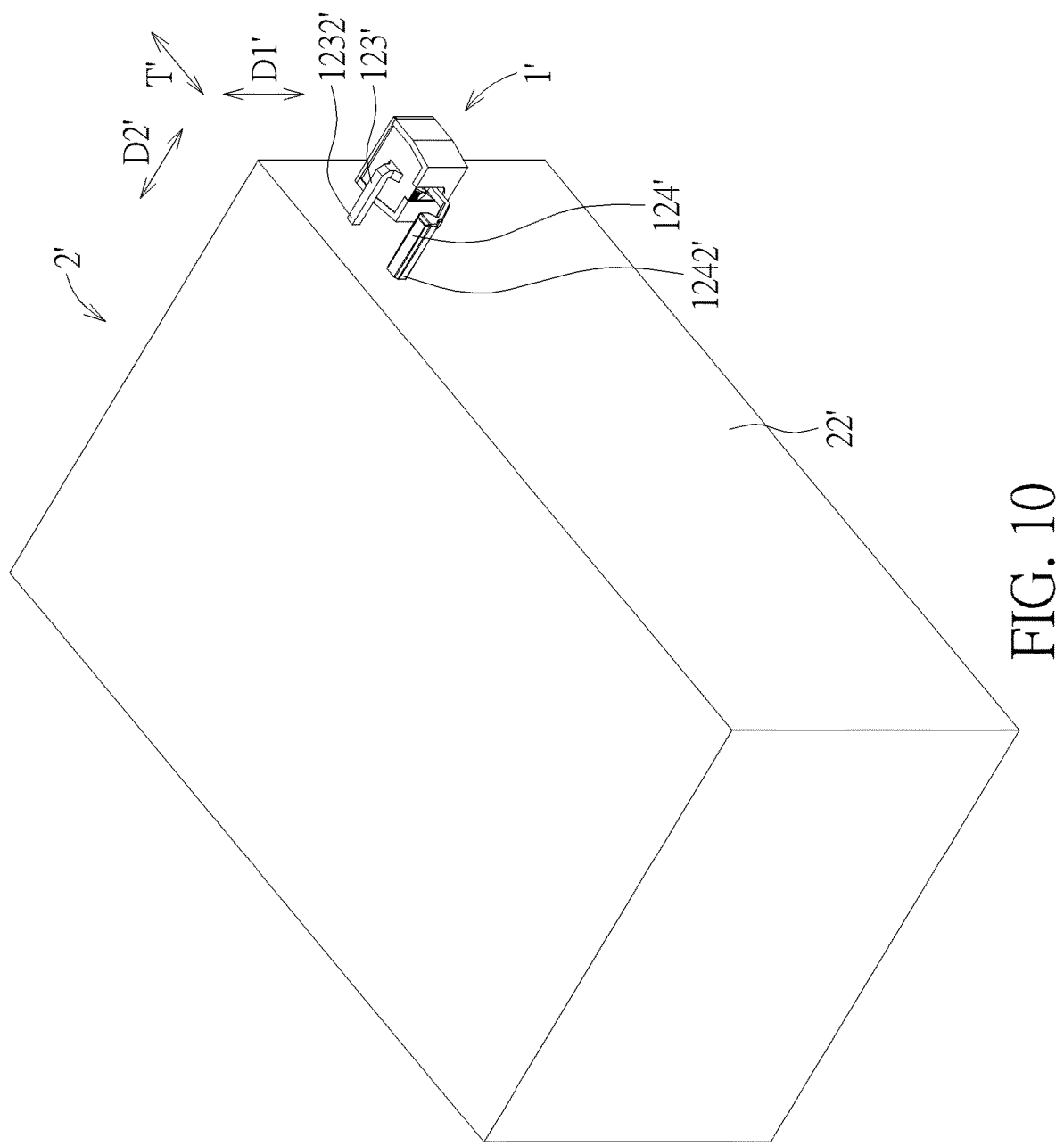

Please further refer to FIG. 9 to FIG. 10. FIG. 9 and FIG. 10 are installation diagrams of an image capturing system 1' at different views according to a second embodiment of the present invention. As shown in FIG. 9 and FIG. 10, different from the first embodiment, the image capturing system 1' of this embodiment is disposed on a lateral side 22' of a moving vehicle 2' adjacent to a bottom side of the moving vehicle 2'. In other words, in the first embodiment, the first fixing connecting portion 1232 of the first supporting component 123 and the second fixing connecting portion 1242 of the second supporting component 124 of the image capturing system 1 are immovably connected to the bottom side 21 of the moving vehicle 2 along the first direction D1. On the other hand, in this embodiment, a first fixing connecting portion 1232' of a first supporting component 123' and a second fixing connecting portion 1242' of a second supporting component 124' of the image capturing system 1' extend along a second direction D2' perpendicular to a travelling direction I' of the moving vehicle 2' and a first direction D1' and immovably connected to the lateral side 22' of the moving vehicle 2'.

In contrast to the prior art, in the present invention, when the moving vehicle vibrates, the present invention can effectively reduce a vibration of the image capturing device for preventing a fuzzy or blurry image by a movable connection of the first supporting component and the case, a movable connection of the second supporting component and the mounting seat, a resilient deformation of the first resilient component connected to the mounting seat and the first supporting component, and a resilient deformation of the second resilient component connected to the mounting seat and the case. The present invention not only has simple structure and low manufacturing cost but also is suitable for a high frequency vibration environment, and therefore, the present invention can solve problems in the prior art.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A shock absorbing device for reducing a vibration of an image capturing device on a moving vehicle, the shock absorbing device comprising:
a case;
a mounting seat movably disposed inside the case, the image capturing device being connected to the mounting seat;
a first supporting component, a first end of the first supporting component being movably connected to the case, a second end of the first supporting component being connected to the moving vehicle;
a second supporting component, a first end of the second supporting component being movably connected to the mounting seat, a second end of the second supporting component being connected to the moving vehicle; and
a resilient assembly comprising:
at least one first resilient component located between the mounting seat and the first supporting component; and
at least one second resilient component located between the mounting seat and the case.

2. The shock absorbing device of claim 1, wherein the first end of the first supporting component is connected to the case and movable relative to the case linearly, and the first end of the second supporting component is connected to the mounting seat and rotatable relative to the mounting seat.

3. The shock absorbing device of claim 2, wherein an opening portion is formed on the case, and the first end of the first supporting component comprises a first connecting portion formed in a plate-shaped structure and located inside the case.

4. The shock absorbing device of claim 3, wherein a restraining structure is formed on the case and located adjacent to the opening portion for stopping the first connecting portion.

5. The shock absorbing device of claim 2, wherein a slot structure is formed on the case, the second supporting component is movably disposed through the slot structure, the first end of the second supporting component comprises a second connecting portion formed in a ball-shaped structure, the mounting seat comprises a connecting portion, an accommodating slot structure and a notch structure communicated with the accommodating slot structure are formed on the connecting portion, the second connecting portion is installed inside the accommodating slot structure and rotatable relative to the accommodating slot structure, and the notch structure cooperates with the second supporting component.

6. The shock absorbing device of claim 1, wherein the case comprises a main body portion and a lateral wall portion, the lateral wall portion is detachably installed on the main body portion, and a through hole structure is formed on the lateral wall portion for allowing the image capturing device to capture light via the through hole structure.

7. The shock absorbing device of claim 6, wherein the lateral wall portion is made of deformable material, the lateral wall portion is concave toward an internal space enclosed by the case, a protruding structure is formed on the lateral wall portion, and the protruding structure is adjacent to the through hole structure and combined with the mounting seat.

8. The shock absorbing device of claim 6, wherein a first engaging structure is formed on the lateral wall portion, a second engaging structure is formed on the main body portion, the first engaging structure detachably engages with the second engaging structure, and the lateral wall portion is installed on the main body portion by an engagement of the first engaging structure and the second engaging structure.

9. The shock absorbing device of claim 1, further comprising a sensor, the mounting seat comprising a mounting portion, the mounting portion comprising an outer shell and an inner shell, the inner shell being fixedly disposed inside the outer shell, the image capturing device being located inside the inner shell, and the sensor being disposed on the inner shell and located between the inner shell and the outer shell for obtaining a moving information of the image capturing device.

10. The shock absorbing device of claim 1, wherein the mounting seat comprises a mounting portion and a connecting portion fixedly connected to the mounting portion, the image capturing device is connected to the mounting portion, and the second supporting component is connected to the connecting portion.

11. The shock absorbing device of claim 1, wherein a longitudinal direction of the at least one first resilient component and a longitudinal direction of the at least one second resilient component are parallel to a first direction and respectively located at two opposite sides of the mounting seat.

12. The shock absorbing device of claim 11, wherein the resilient assembly further comprises at least one third resilient component and at least one fourth resilient component, and a longitudinal direction of the at least one third resilient component and a longitudinal direction of the at least one fourth resilient component are perpendicular to the first direction and respectively located at another two opposite sides of the mounting seat.

13. An image capturing system for a moving vehicle, the image capturing system comprising:
an image capturing device; and
a shock absorbing device for reducing a vibration of the image capturing device on the moving vehicle, the shock absorbing device comprising:
a case;
a mounting seat movably disposed inside the case, the image capturing device being connected to the mounting seat;
a first supporting component, a first end of the first supporting component being movably connected to the case, a second end of the first supporting component being connected to the moving vehicle;
a second supporting component, a first end of the second supporting component being movably connected to the mounting seat, a second end of the second supporting component being connected to the moving vehicle; and
a resilient assembly comprising:
at least one first resilient component located between the mounting seat and the first supporting component; and
at least one second resilient component located between the mounting seat and the case.

14. The image capturing system of claim 13, wherein the first end of the first supporting component is connected to the case and movable relative to the case linearly, and the first end of the second supporting component is connected to the mounting seat and rotatable relative to the mounting seat.

15. The image capturing system of claim 14, wherein an opening portion and a restraining structure are formed on the case, the first end of the first supporting component comprises a first connecting portion formed in a plate-shaped structure and located inside the case, a shape and a size of the opening portion respectively match with a shape and a size of the first connecting portion, and the restraining structure is located adjacent to the opening portion for stopping the first connecting portion.

16. The image capturing system of claim 14, wherein a slot structure is formed on the case, the second supporting component is movably disposed through the slot structure, the first end of the second supporting component comprises a second connecting portion formed in a ball-shaped structure, the mounting seat comprises a connecting portion, an accommodating slot structure and a notch structure communicated with the accommodating slot structure are formed on the connecting portion, the second connecting portion is installed inside the accommodating slot structure and rotatable relative to the accommodating slot structure, and the notch structure cooperates with the second supporting component.

17. The image capturing system of claim 13, wherein the case comprises a main body portion and a lateral wall portion, the lateral wall portion is detachably installed on the main body portion, a through hole structure is formed on the lateral wall portion for allowing the image capturing device to capture light via the through hole structure, the lateral wall portion is made of deformable material, the lateral wall portion is concave toward an internal space enclosed by the case, a protruding structure is formed on the lateral wall portion, and the protruding structure is adjacent to the through hole structure and combined with the mounting seat.

18. The image capturing system of claim 17, wherein a first engaging structure is formed on the lateral wall portion, a second engaging structure is formed on the main body portion, the first engaging structure detachably engages with the second engaging structure, and the lateral wall portion is installed on the main body portion by an engagement of the first engaging structure and the second engaging structure.

19. The image capturing system of claim 13, wherein the shock absorbing device further comprises a sensor, the mounting seat comprises a mounting portion, the mounting portion comprises an outer shell and an inner shell, the inner shell is fixedly disposed inside the outer shell, the image capturing device is located inside the inner shell, and the sensor is disposed on the inner shell and located between the inner shell and the outer shell for obtaining a moving information of the image capturing device.

20. The image capturing system of claim 13, wherein the resilient assembly further comprises at least one third resilient component and at least one fourth resilient component, a longitudinal direction of the at least one first resilient component and a longitudinal direction of the at least one second resilient component are parallel to a first direction and respectively located at two opposite sides of the mounting seat, and a longitudinal direction of the at least one third resilient component and a longitudinal direction of the at least one fourth resilient component are perpendicular to the first direction and respectively located at another two opposite sides of the mounting seat.

* * * * *